UNITED STATES PATENT OFFICE.

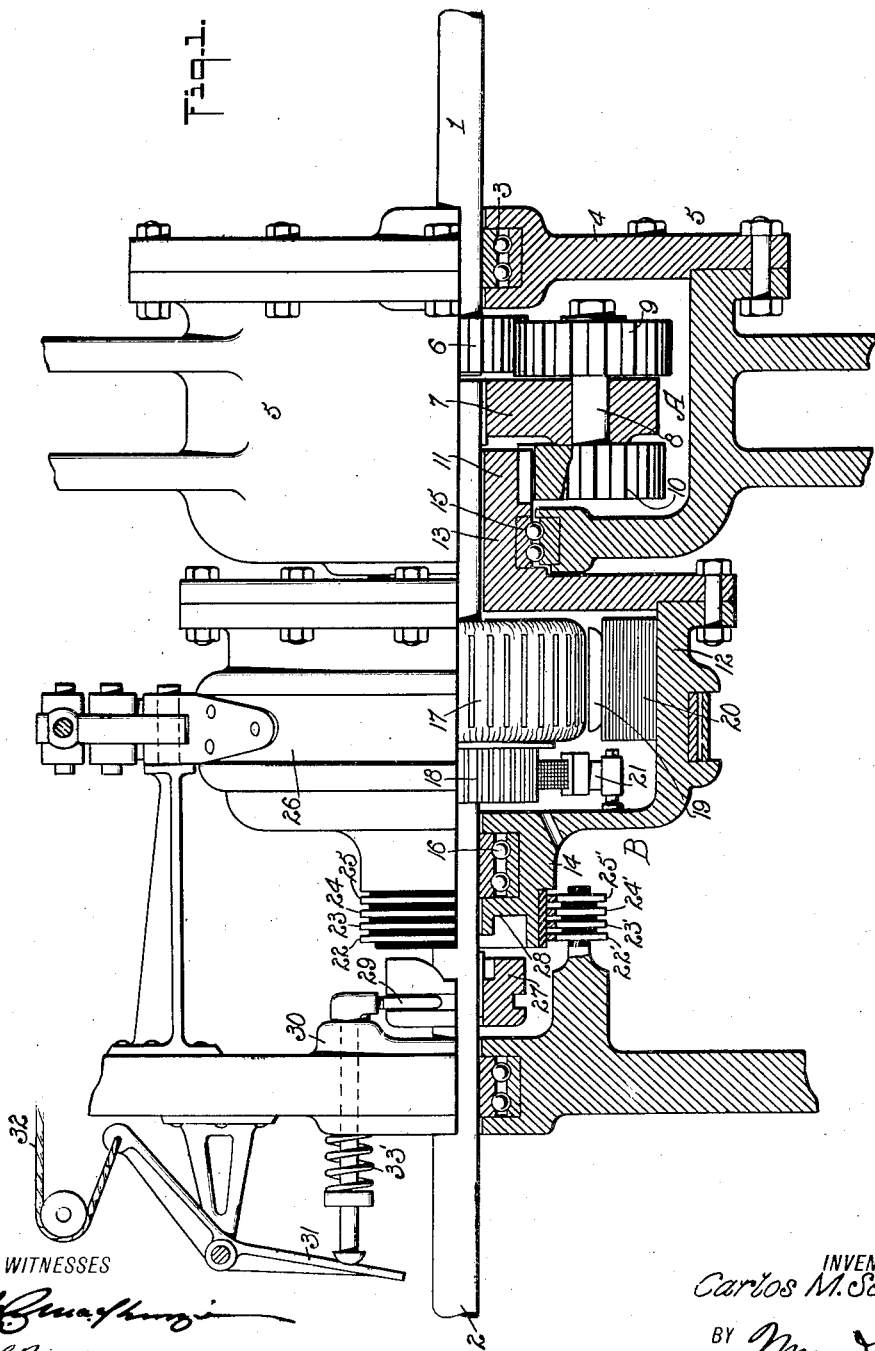

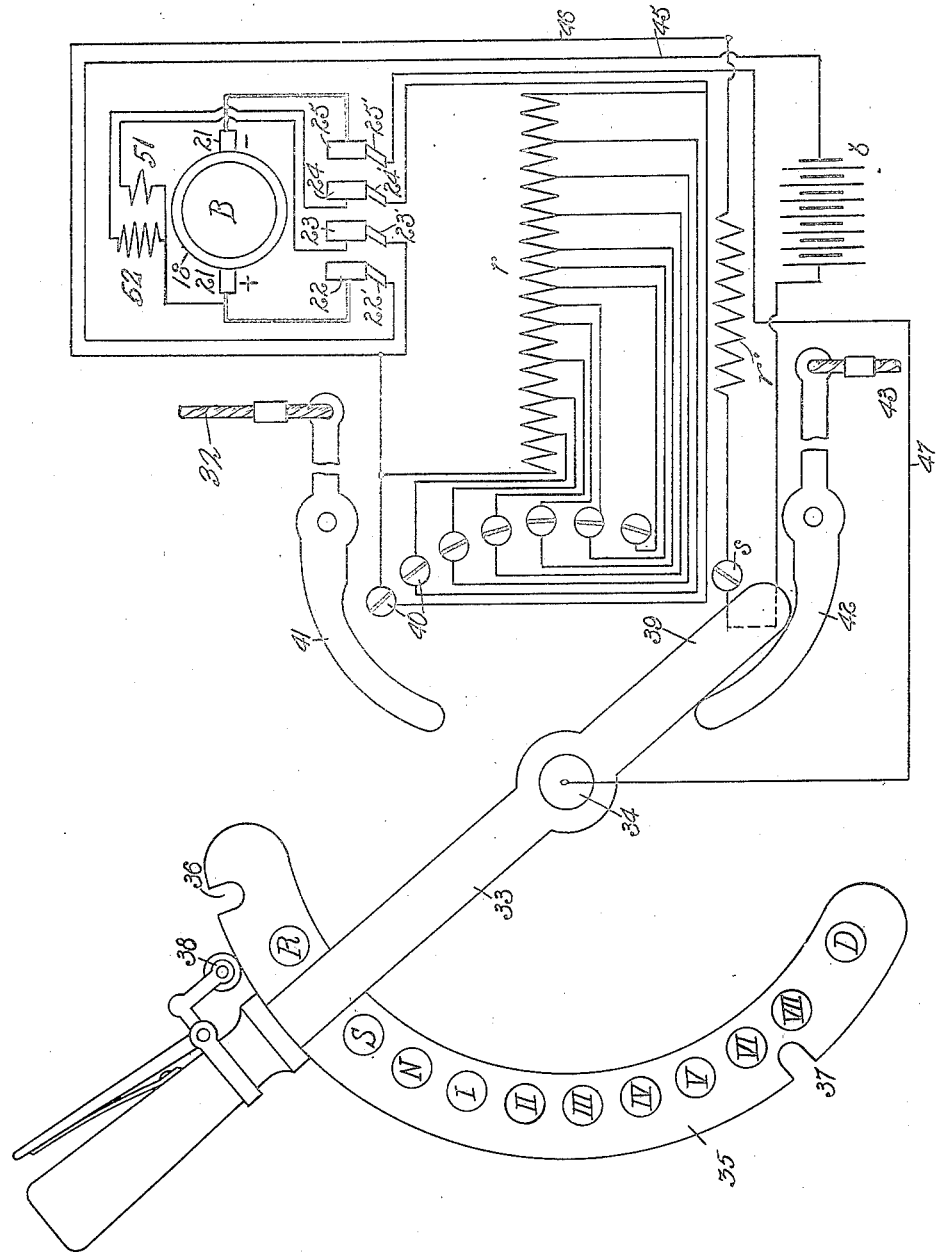

CARLOS M. SEIDEL, OF HABANA, CUBA.

DIFFERENTIAL MAGNETIC SPEED-CHANGING TRANSMISSION MECHANISM.

1,289,935.   Specification of Letters Patent.   Patented Dec. 31, 1918.

Application filed October 30, 1916. Serial No. 128,446.

*To all whom it may concern:*

Be it known that I, CARLOS M. SEIDEL, a citizen of the Republic of Cuba, and a resident of Habana, Cuba, have invented a new and Improved Differential Magnetic Speed-Changing Transmission Mechanism, of which the following is a full, clear, and exact description.

This invention relates to transmission mechanism especially adapted for vehicles propelled by an internal combustion engine, and it relates particularly to that type of transmission in which a rotating field and armature electrical machine forms a clutch between the engine and driving wheels of the vehicle.

The invention has for its general objects to improve the construction and operation of transmission mechanism of this character so as to be reliable and efficient in use, comparatively simple and inexpensive to manufacture and readily controlled from the steering wheel to produce an infinite variety of forward speed ratios and a single reverse speed ratio.

A more specific object of the invention is the provision of a novel combination of differential gearing and an electric clutch between the prime mover and driving wheels for obtaining various speed ratios and small gradations of speed in addition to utilizing the electric machine for starting the prime mover.

An additional object is the provision of a novel controlling means associated with the steering wheel or conveniently within reach of the driver for varying the electric circuits to change the slippage between the armature and field elements of the electric machine, whereby smooth gradations of speed within wide limits can be obtained.

The invention has as a further object the provision of means whereby the field and armature elements can be mechanically locked together for direct transmission from the engine shaft to the driving wheels when the controlling mechanism has been successively operated to progressively increase the drag between the armature and field elements.

Still another object is the employment in connection with the electric machine controlling device of a clutch for arresting the rotation of the field element, whereby the armature can freely rotate and act as a reversing mechanism for the automobile.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in both the views, Figure 1 is a combined side elevation and section of the transmission mechanism; and Fig. 2 is a diagrammatic view of the electric machine circuits and controlling devices.

Referring to the drawing, 1 designates the engine shaft, and 2 the propeller shaft which is connected with the driving wheels of the vehicle, there being a differential gearing A between the two shafts and an electric machine B, which for speed changing acts as a magnetic clutch, and for starting as a motor.

The shaft 1 has one end journaled in a bearing 3 in the wall 4 of the gear casing 5, and on the inner end of the shaft 1 is a pinion 6. Keyed to the adjacent end of the shaft 2, which alines with the shaft 1, is a disk 7. At spaced points on this disk are shafts 8 which have fastened thereto at opposite sides of the disk, gears 9 and 10. The gears 9 mesh with the central gear 6 on the engine shaft. Only one set of gears 9 and 10 is shown, but it is to be understood that the others are concealed in the top of the casing 5. The gears 10 mesh with a central gear 11 which freely rotates on the shaft 2 and is connected with the field frame or casing 12 of the machine B. This casing 12 has two hubs 13 and 14, the former of which extends into the gear casing 5 and rotates in bearings 15 within the wall of such casing. The other hub has an internal bearing 16 for supporting the casing 12 to rotate on the shaft 2.

The electric machine B comprises an armature 17 which, with its commutator 18, is fastened to the shaft 2, and surrounding the armature is the field frame, which has a plurality of field poles 19 and windings 20. On the casing 12 are brushes 21 which bear on the commutator. The hub of the casing 12 has a plurality of collector rings 22, 23, 24 and 25 against which bear brushes 22', 23', 24' and 25', whereby the machine is connected with the current supply and controlling circuits, and these collector rings are in turn connected with the brushes 21 and field windings, as clearly shown in the diagram.

Surrounding the casing 12 of the electric machine is a clutch or brake band 26 which is operated in any suitable manner through a cable leading to the lever conveniently operable by the driver, and when the brake band 26 is clutched, the field element of the electric machine can be held stationary while the engine operates through the differential gearing A to reverse the car.

For direct transmission from the engine to the driving wheel the field element of the electric machine can be mechanically connected with the shaft 2, and for this purpose a clutch element 27 is feathered on the shaft 2 and arranged to slide into interlocking relation with the clutch element 28 carried by the hub 14. The sliding clutch element 27 is operated by a fork 29 slidable in a bearing 30 and this fork element is moved in one direction by a lever or equivalent means 31 through the pulling of a cable 32 under the control of the operator, and the forked element is moved in the opposite direction by a spring 33'.

The driver can control the mechanism by means of a single lever to obtain four different results, namely, the starting of the engine, the forward propulsion of the car with the smooth acceleration of speed, the locking of the engine with the propeller shaft for direct drive, and the reversing of the driving connections for driving the car rearwardly. The controlling lever, which is designated 33, Fig. 2, is pivoted at 34 on the steering wheel so as to be conveniently operated by the driver, and associated with this lever is a sector 35 having a plurality of points designated respectively S for starting position, N for neutral position, R for reverse drive position, I. to VII. for different speed positions, and D for direct drive position. The sector has notches 36 and 37 with which is adapted to engage a catch 38 on the lever to lock the lever in reverse or direct drive position. The end 39 of the lever coöperates with a plurality of contacts 40 for cutting into and out of circuit the resistance $r$ to vary the drag or slip between the armature and field elements of the electric machine or clutch B. Also associated with the end of the lever 33 are levers 41 and 42 for operating respectively the clutch member 27 for the direct drive and for setting the brake band 26 for effecting the reverse drive, the lever 41 being connected with the cable 32 and the lever 42 being connected by a cable or other suitable means 43 with the actuating means of the brake band 26. An additional contact $s$ is associated with the group of contacts 40 so that the resistance $r'$ can be connected in circuit with the machine B in starting the engine. The current for the machine B is derived from a storage battery $b$ or equivalent source, and this battery has one terminal connected by a wire 45 with the brush 22' and the other terminal is connected by a wire 46 with a brush 23' and is also connected with the resistance $r$ and $r'$. The brush 24' is connected with the seventh or last contact of the group 40, while the brush 25' is connected by a wire 47 with the lever 33, so that when the lever engages any of the contacts a complete circuit will be made through the armature and field windings of the machine B. When the lever 33 is on the contact N, the electric circuits will be open, so that there will be no magnetic action between the armature and field elements of the machine B, even though the explosive engine may be running, and as a consequence the propeller shaft of the car will be at rest. By moving the lever 33 downwardly, Fig. 2, from the neutral point N, power with progressively increasing force will be imparted to the driving wheels of the car through the magnetic clutching action of the machine B, there being a progressively decreasing slip or an increasing magnetic attraction between the armature and field elements as the lever 33 moves from the contact I. to the contact VII. Finally, when the lever reaches the point D, the resistance will be entirely cut out and the clutch element 27 will be engaged with the clutch element 28 by the lever 33 operating the lever 41, and consequently the engine shaft 1 will be connected directly with the propeller shaft 2.

When the engine is not running and it is desired to start it, the lever 33 is moved upwardly from the neutral point N to the starting point S, whereby the extremity 39 of the lever will engage the contact $s$ and connect the resistance $r'$ in circuit with the battery and machine B. The propeller shaft will be held stationary by the driving wheels in contact with the road surface, and consequently the magnetic action between the armature and field elements of the machine B will cause the field element to revolve, and this in turn will operate through the differential gearing to turn the engine shaft to start the engine. When the driven shaft 2 is to be rotated in reverse direction, as for backing the vehicle, the lever is moved over the point R, which causes the lever 33 to actuate the lever 42, whereby the brake band 26 is set so as to hold the field element of the machine B stationary while the engine shaft operates through the differential gearing to reverse rotation of the armature shaft 2, and thereby drive the car rearwardly.

When lever 33 is in the neutral position N or in the position shown in Fig. 2 or in the regular driving position D, the armature of dynamo B is on open circuit as will be seen by tracing the conductor 21—25—25'—47—39. Hence at such time no electromagnetic reactions between the field and armature will be possible. When the handle is moved to position S for starting, then ergizing shunt circuits for the field and armature are established as follows: for the armature, 21 (—) 25—25'—47—39—s—b—45—22'—22—21 (+); for field winding 51, 21 (—) 25—25'—47—39—s—r'—46—23'—23—51—21 (+); for field winding 52, 21 (—) —25—25'—47—39—s—r'—46—r—24'—24—52—21 (+). The resistance r lies between the field windings 51 and 52 the conductive connection being traced 51—23—23'—r—24'—24—52. The insulated right portions of contacts 40 are tapped to small portions of the left half of resistance r all of which can be shunted off gradually from the field coils 51 and the left sides of contacts 40 are tapped to small portions of the right half of resistance r all of which can be shunted off gradually from the field coils 52, as the lever 33 is moved from position I to VII.

When the handle is moved to position I the self-exciting circuits from the armature to the field coils 51 and 52 each comprise a full half portion of resistance r, but on position II, a small middle portion of the resistance r will be simultaneously shunted off from said field coils, on position III a larger middle portion of resistance r will be shunted out, and so on, till on position VII, all the resistance will be shunted out of these circuits, and they will then be traced as follows: 21 (—) 25—25'—47—39 upper contact 40—23'—23—51—21 (+) 21 (—) 25—25'—47—39 lower contact 40—24'—24—52—21 (+).

Thus it will be seen that as the handle goes from position I to position VII, the resistance is reduced in the circuits of the field and armature, increasing the electromagnetic drag between them and tending to reduce the slip between them so that the shafts 1 and 2 will be rotating nearly together when the handle goes to the full driving position D, and the shafts 1 and 2 are then locked together mechanically.

From the foregoing description taken in connection with the accompanying drawing, the advantages of the construction and method of operation will be readily understood by those skilled in the art to which the invention appertains, and while I have described the principle of operation, together with the mechanism which I now consider to be the best embodiment thereof, I desire to have it understood that the mechanism shown is merely illustrative and that such changes may be made when desired as fall within the scope of the appended claims.

Having thus described my invention, I claim as new and desire to secure by Letters Patent:

1. In a transmission mechanism, the combination of a driving shaft, a driven shaft, an electric machine comprising an armature on the driven shaft and a rotatably mounted field, a differential gearing operatively connecting the engine shaft with the driven shaft and with the said rotatable field, and a stationary casing around the differential gearing.

2. In a transmission mechanism, the combination of a driving shaft, a driven shaft, an electric machine comprising an armature on the driven shaft and a rotatably mounted field, a differential gearing operatively connecting the engine shaft with the driven shaft and with the said rotatable field, a stationary casing around the differential gearing, and means controlled at will for arresting the rotatable field.

3. In a transmission mechanism, the combination of a driving shaft, a driven shaft, an electric machine comprising an armature on the driven shaft and a rotatably mounted field, a differential gearing operatively connecting the engine shaft with the driven shaft and with the said rotatable field, a stationary casing around the differential gearing, means controlled at will for arresting the rotatable field, and means for positively locking the rotatable field to the driven shaft.

4. In a transmission mechanism, the combination of a driving shaft, a driven shaft, an electric machine comprising an armature on the driven shaft and a rotatably mounted field, a differential gearing operatively connecting the engine shaft with the driven shaft and with the said rotatable field, a stationary casing around the differential gearing, and means for locking the rotatable field to the driven shaft.

5. In transmission mechanism, the combination of a driving shaft, a driven shaft, an electric machine comprising an armature on the driven shaft and a rotatably mounted field, a differential gearing operatively connecting the engine shaft with the driven shaft and with the said rotatable field, a stationary casing around the differential gearing, a controller for controlling the circuits of the electrical machine to vary the drag between the armature and field, and means actuated by the controller for arresting the motion of the field.

6. In a transmission mechanism, the combination of a driving shaft, a driven shaft, an electric machine comprising an armature on the driven shaft and a rotatably mounted field, a differential gearing operatively connecting the engine shaft with the driven shaft and with the said rotatable field, a stationary casing around the differential gearing, a controller for controlling the circuits of the electrical machine to vary the drag between the armature and field, and means actuated by the controller for locking the said field to the driven shaft.

7. In a transmission mechanism, the combination of a driving shaft, a driven shaft, an electric machine comprising an armature on the driven shaft and a rotatably mounted field, a differential gearing operatively connecting the engine shaft with the driven shaft and with the said rotatable field, a controller for controlling the circuits of the electrical machine to vary the drag between the armature and field, means actuated by the controller at one extreme of its movement for arresting the motion of the field, and means actuated by the controller at the other extreme of its movement for locking the said field to the driven shaft.

8. A transmission of the class described comprising an engine shaft, a gear thereon, a driven shaft, a carrier thereon, separate sets of gears rotatably mounted on the carrier and one set meshing with the gear on the engine shaft, a magnetic clutch comprising an armature on the driven shaft and a rotatable field, a gear connected with the rotatable field and meshing with the second set of gears on the carrier, said two sets of gears being on opposite sides of the carrier and connected each to each to rotate together and a controller for controlling the circuits of the field and armature, whereby the engine shaft can be rotated for starting the engine, and whereby the engine can drive the driven shaft at a variable speed.

9. A transmission of the class described comprising an engine shaft, a gear thereon, a driven shaft, a carrier thereon, separate sets of gears rotatably mounted on the carrier and one set meshing with the gear on the engine shaft, a magnetic clutch comprising an armature on the driven shaft and a rotatable field, a gear connected with the rotatable field and meshing with the second set of gears on the carrier, said two sets of gears being on opposite sides of the carrier and connected each to each to rotate together, a controller for controlling the circuits of the field and armature, whereby the engine shaft can be rotated for starting the engine, and whereby the engine can drive the driven shaft at a variable speed, and means associated with the controller for locking the field to the driven shaft.

10. A transmission of the class described comprising an engine shaft, a gear thereon, a driven shaft, a carrier thereon, separate sets of gears rotatably mounted on the carrier and one set meshing with the gear on the engine shaft, a magnetic clutch comprising an armature on the driven shaft and a rotatable field, a gear connected with the rotable field and meshing with the second set of gears on the carrier, said two sets of gears being on opposite sides of the carrier and connected each to each to rotate together, a controller for controlling the circuits of the field and armature, whereby the engine shaft can be rotated for starting the engine, and whereby the engine can drive the driven shaft at a variable speed, means associated with the controller for locking the field to the driven shaft, and means associated with the controller for arresting the rotation of the field while the latter is disconnected from the driven shaft.

11. A transmission of the class described comprising an engine shaft, a gear thereon, driven shaft, a carrier thereon, separate sets of gears rotatably mounted on the carrier and one set meshing with the gear on the engine shaft, a magnetic clutch comprising an armature on the driven shaft and a rotatable field, a gear connected with the rotatable field and meshing with the second set of gears on the carrier, said two sets of gears being on opposite sides of the carrier and connected each to each to rotate together, a controller for controlling the circuits of the field and armature, whereby the engine shaft can be rotated for starting the engine and whereby the engine can drive the driven shaft at a variable speed, and means associated with the controller for arresting the field.

12. In a transmission mechanism, a driving shaft and a driven shaft in alinement, one member of a dynamo electric machine carried by the driven shaft, a casing for the other member thereof, said casing being rotatable therewith, a differential gear connecting the two shafts and said other member, a stationary casing therefor, and a bearing in said stationary casing for said rotatable casing.

13. In a transmission mechanism, a driving shaft and a driven shaft in alinement, one member of a dynamo electric machine carried by the driven shaft, the other member thereof mounted in coaxial bearings, and a differential gear connecting the driving shaft with said other member, said gear comprising a spider fixed on the driven shaft, with short shafts rotatably mounted therein parallel with the driven shaft and with gear wheels on both ends of said short shafts, other gear wheels on the driving shaft and on said other member engaging said gear wheels on the ends of the short shafts respectively, and a stationary casing around said gears.

14. In a transmission mechanism, a driving shaft and a driven shaft in alinement, one member of a dynamo electric machine carried by the driven shaft, the other member thereof mounted in coaxial bearings, a differential gear connecting the said shafts and said other element, means to lock the said other element stationary for reverse drive, rheostatic means to adjust the drag between the two members, mechanical means to lock the two shafts together for direct drive, and a controller handle adapted at one extreme of its range of movement to lock said other element for reverse drive and by intermediate movement therefrom to increase the drag between the two members and at the other extreme of its range of movement to actuate said mechanical means to lock the two shafts together for direct drive.

15. In a transmission mechanism, a driving shaft and a driven shaft in alinement, one member of a dynamo electric machine carried by the driven shaft, the other member of said machine and both said shafts being operatively connected together by means of differential gearing, and a stationary casing around said gearing adapted for support on an automobile frame.

16. In a transmission mechanism, a driving shaft and a driven shaft in alinement, one member of a dynamo electric machine carried by the driven shaft, a casing for the other member thereof, said casing being rotatable therewith, a differential gear connecting the two shafts and said other member, a casing for said differential gear, and a bearing for one of said casings on the other of said casings.

17. In a transmission mechanism, a driving shaft and a driven shaft in alinement, one member of a dynamo electric machine carried by the driven shaft, differential gearing connecting the two shafts and the other member of said machine, and a stationary casing around said gearing supporting both shafts close to their respective adjacent ends.

18. In a transmission mechanism, a driving shaft and a driven shaft in alinement, one member of a dynamo electric machine carried by the driven shaft, a casing for the other member thereof, said casing being rotatable therewith and said other member surrounding the first mentioned member, and a differential gear mechanism connecting the two shafts and said other member, the planetary gears being carried by the driven shaft and one sun gear carried by the driving shaft and the other sun gear carried by the said other member, said driven shaft having a spider for carrying the planetary gears between the two sun gears.

19. In a transmission mechanism, a driving shaft and a driven shaft in alinement, one member of a dynamo electric machine carried by the driven shaft, a casing for the other member thereof, said casing being rotatable therewith and said other member surrounding the first mentioned member, a differential gear mechanism connecting the two shafts and said other member, the planetary gears being carried by the driven shaft and one sun gear carried by the driving shaft and the other sun gear carried by the said other member, said driven shaft having a spider for carrying the planetary gears between the two sun gears, and a stationary casing around said differential gear mechanism.

CARLOS M. SEIDEL.